INVENTOR.
WALLACE R. MILLS

BY *Nolte and Nolte*

ATTORNEYS

United States Patent Office 3,380,474
Patented Apr. 30, 1968

3,380,474
FLAP VALVE DEVICE
Wallace R. Mills, Mountain Lakes, N.J., assignor, by mesne assignments, to International Controls Corp., Fairfield, N.J., a corporation of Florida
Filed Aug. 5, 1965, Ser. No. 477,425
9 Claims. (Cl. 137—517)

ABSTRACT OF THE DISCLOSURE

A flapper type valve to restrict fluid flow when the flow exceeds a given value. The valve includes a conduit means having inner coaxial bore portions of different diameters which define between themselves, at the upstream end of the smaller bore portion, a valve seat toward which the fluid flows. A flapper has a closed position engaging this valve seat and an open position situated adjacent and extending along the inner surface of the conduit means which defines the bore portion of larger diameter. This flapper is urged to its open position by an elongated leaf spring which has an upstream end which is fixed to the downstream end of the flapper. The flapper has a width which gradually increases from its upstream end toward its downstream end so that it is of a gradually increasing width. The increasing width of the flapper from its upstream toward its downstream end, as well as lobes thereof between which the upstream end of the leaf spring is located, compensate for the decrease in the length of the lever arm acting on the leaf spring to turn the latter as the length of this lever arm decreases from the upstream toward the downstream end of the flapper, so that in this way the forces with which the fluid acts upon the flapper are equalized.

This invention relates to a valve and in particular to a flapper type valve which is placed within a conduit to restrict the flow of fluid when this flow exceeds a certain pre-determined value.

It is an object of the present invention to provide a valve which can be inserted in a conduit, which valve is reliable, automatic, inexpensive and adjustable to meet a wide range of fluid flow.

According to this invention, a seat is placed within a conduit passageway and a flapper is retained out of contact with this seat by means of a spring. The flapper is disposed in the conduit in such a position that flow of the fluid tends to cause it to approach the seat against the action of the spring. Thus, a flow greater than a predetermined amount will cause closure of the valve, and the valve will be held closed by the difference in pressures between the fluid in the conduit upstream and downstream of the valve. Or, put another way, if the downstream pressure drops below a certain value, the upstream pressure remaining substantially constant, the valve will close. It will remain closed until the pressure differential between the upstream portion of the conduit and the downstream portion is reduced sufficiently to permit the flapper to return to its original open position. Thus, it can be seen that when fluid flow reaches a certain value the flapper is forced into engagement with the seat thereby forming a seal. To reopen the valve the pressure differential across the flapper must be reduced so that the restoring force of the spring will lift the flap from its engagement with the seat, thus once again permitting the flow of fluid through the valve. The degree of introduction of the flapper into the flow stream would vary the cut-off value and could be adjusted by an adjustable screw accessible from the outside of the valve. The valve can thus be used over a wide range of fluid flow.

Further features and objects of this invention may be understood from the specification below and from the accompanying drawings, in which.

Figure 1:
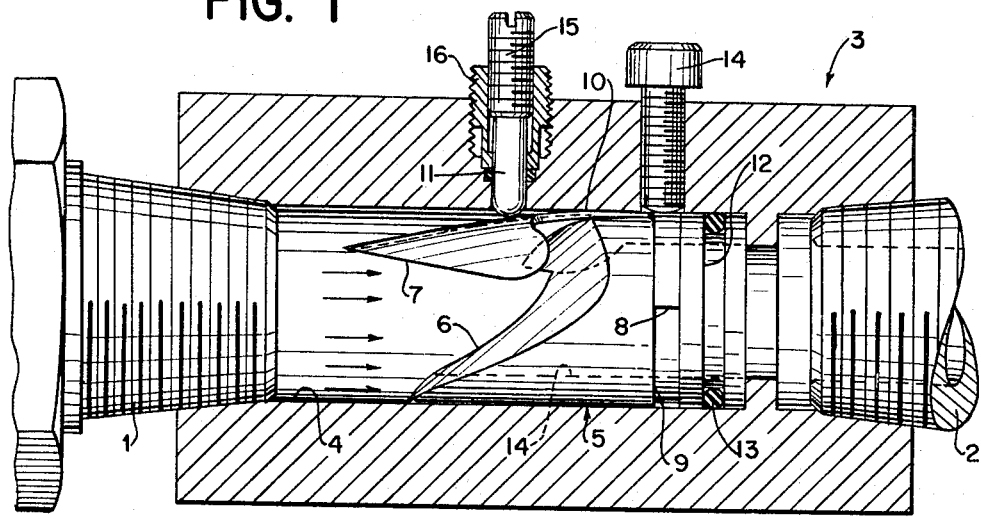
FIG. 1 is an elevational view partly in section showing the flapper valve in the open position.

Referring now to the figures in which corresponding numbers identify corresponding elements, conduits 1 and 2 are connected to the valve body 3 in any known manner as by threading. As seen in FIG. 1, the fluid flow is from left to right, that is, from conduit 1 through the valve body 3 into conduit 2. In the passageway 4 in the valve body 3, the elements of the valve proper are disposed.

A seat 6 is formed on one end of a hollow cylinder 5, by the arcuate surface on the left end thereof, cooperating with a corresponding surface on a flapper 7 to form a seal therewith. The flapper 7 may be a single integral structure of spring material. In the shown form, a partial band 8 is seated in a groove 9 in the cylinder 5, and a longitudinal portion 10, in a longitudinal groove in the cylinder 5 serves to connect the leaf-shaped flapper 7 with the band 8, holding it in cooperative relation with the seat, but free to move as required. When the fluid flow is less than the predetermined cut-off limit the flapper 7 is held in the open position as shown in FIG. 1 due to the restraining force exerted on it by the spring member 10.

Figure 2:
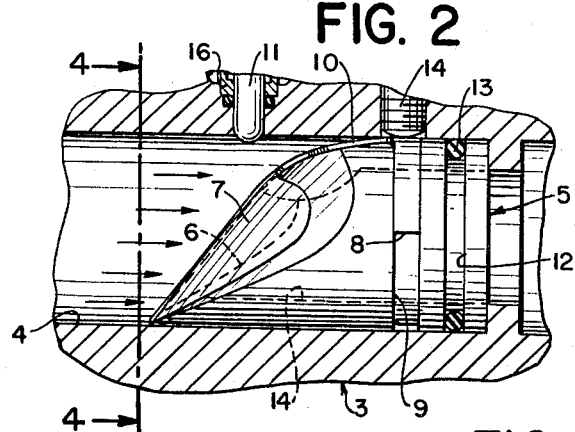
FIG. 2 is a fragmentary sectional view showing the flapper in the shut position.

A second notch 12 is provided around seat 6 around which an O-ring 13 of a suitable elastomeric material is placed to insure a complete fluid seal along the outer surfaces of the cylinder 5 so that the fluid passing through the valve, when the valve is in the open position, will flow through the inner narrow portion of the valve. When the flapper is in the closed position of FIG. 2, the O-ring seal will prevent fluid from flowing through the valve. A fastening nut 14, which is threadably placed through the valve body as shown in FIG. 1, exerts a downward force upon the spring portion 8 of the flapper, and retains the valve within the valve body. A hollow bushing 16 is threadably placed into the valve body and an adjustment member 15 is placed into the hollow portion and is threadably engaged to the bushing 16. The adjustment member extends into the valve passageway 4 and engages the top surface of flapper 7. By adjusting the position of adjustment member 15, the position of the flapper 7 within the passageway 4, relative to the fluid flow can be altered. In this manner the cut-off point of fluid flow can be selected by a simple adjustment of adjustment member 15.

The fluid enters the valve passageway 4 from input conduit 1. The impact pressure of the fluid flow exerts a force upon the valve flapper 7 urging it in a downward position. At the same time, the pressure differential caused by the fluid flow over the top and bottom surfaces of the flapper creates a pressure differential and a similar downward force. When the resultant of these two forces exceeds the restraining force exerted by spring 10, the flapper is urged downward into the position shown in FIG. 2, thereby creating a seal thereby cutting off the fluid flow. It is seen that the point at which the fluid flow is cut off is determined by both the velocity and the volume of the fluid flow. When the fluid flow is reduced, the force exerted on the flapper is likewise reduced and at the point at which the restraining force of the spring exceeds this new downward force on the flapper, the flapper is once again lifted into the open position and fluid once again flows through the valve and into outlet conduit 2.

Figure 3:
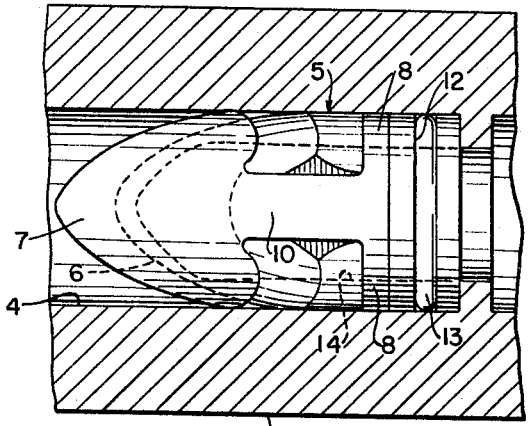
FIG. 3 is a plan view of the valve portion.
Figure 4:
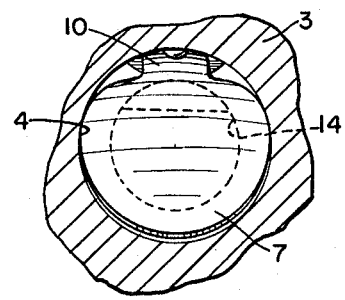
FIG. 4 is a sectional view taken along line 4—4 of FIG. 2.

FIG. 3 is a top plan view of the flapper in the open position showing the structure of the flapper and the structure of the seat and spring member 10. FIG. 4 shows the flapper in the closed position showing the fluid seal as seen from the input end of the valve body. The diameter of the output conduit 2 is shown in FIG. 4 by the dotted circular portion 14.

Thus with the structure of the invention the outer valve body 3 and the inner cylinder 5 fixed therein form a conduit means having inner coaxial bore portions one of which is smaller than the other, and these bore portions define, at the upstream end of the bore portion of smaller diameter, the valve seat 6. The flapper 7 has its closed position engaging this valve seat and its open position indicated in FIG. 1 where it extends substantially axially of the conduit means 3, 5 adjacent the surface which defines the bore portion of larger diameter, which is to say the inner surface of the valve body 3. The leaf spring 10 extends substantially axially of the coaxial bore portions and is situated at the region of the inner surface which defines the bore portion of larger diameter, being fixed to this latter surface and having an upstream end which is fixed to the downstream end of the flapper 7. It will be noted that the flapper 7 is of a gradually increasing width from its upstream toward its downstream end so that its minimum width is situated at its end which is most distant from the leaf spring 10, and in fact the flapper 7 has at its downstream end a pair of lobes between which the upstream end of the spring 10 is located. As a result of this construction when the fluid starts to turn the flapper toward its closed position, the gradually increasing width of the flapper from its upstream toward its downstream end compensates for the gradual decrease in the lever arm acting on the leaf spring 10 so that forces acting on the flapper during its closing movement tend to become equalized axially along the flapper from its upstream toward its downstream end. In fact, once the flapper starts to turn toward its closed position the leaf spring 10 itself is at least partly exposed to the fluid to be acted on thereby to be urged together with the flapper toward the closed position of the latter.

While only one embodiment of this invention has been shown, the scope of this invention should not be limited thereby but rather by the scope of the appended claims.

What I claim is:

1. A fluid valve comprising, conduit means through which a fluid is adapted to flow in a given direction, said conduit means having inner coaxial bore portions of different diameters defining between themselves a valve seat situated at the upstream end of the smaller bore portion, a flapper situated in said bore portion of larger diameter of said conduit means adjacent said upstream end of said smaller bore portion and having a closed position engaging said valve seat and an open position extending substantially axially of said conduit means adjacent to the inner surface thereof which defines said bore portion of larger diameter, said flapper having a width which gradually increases from its upstream toward its downstream end so that it is of a maximum width in the region of its downstream end and of a minimum width in the region of its upstream end, and an elongated leaf spring connected to said downstream end of said flapper for urging the latter to its open position, said leaf spring extending in a downstream direction from said downstream end of said flapper, being fixed to said conduit means at the inner surface thereof which defines said bore portion of larger diameter, and being situated at the upstream end of said bore portion of smaller diameter where said valve seat is located, whereby, when the force of the fluid acts on said flapper to urge the latter from its open toward its closed position in opposition to said leaf spring, the force with which the fluid acts on the flapper tends to become equalized axially therealong from its upstream toward its downstream end because of compensation for the decrease in the lever arm acting on said leaf spring by the increasing width of the flapper from its upstream toward its downstream end.

2. The combination of claim 1 and wherein said flapper has at its downstream end a pair of laterally spaced lobes between which the upstream end of said leaf spring is located.

3. The combination of claim 2 and wherein said leaf spring and flapper are made of a single unitary body of springy sheet material.

4. The combination of claim 1 and wherein an adjusting means is carried by said conduit means and engages said flapper to determine the open position thereof.

5. The combination of claim 1 and wherein said conduit means comprises an outer cylindrical body having an inner surface defining said bore portion of larger diameter and a hollow inner cylindrical body fixed to said outer body in the interior thereof and having an inner surface defining said inner bore portion of smaller diameter, said leaf spring extending between said cylindrical bodies.

6. The combination of claim 5 and wherein said inner cylindrical body is formed at its exterior surface with an axial groove which receives said leaf spring.

7. The combination of claim 6 and wherein said inner cylindrical body is formed at its exterior surface with an annular groove situated at the downstream end of said leaf spring and said leaf spring terminating at its downstream end in lateral extensions situated in said annular groove.

8. The combination of claim 7 and wherein a screw member extends threadedly through said outer cylindrical body and has an inner end pressing against said leaf spring and inner cylindrical body for fixing said leaf spring and inner cylindrical body to said outer cylindrical body.

9. The combination of claim 8 and wherein said leaf spring is integral with said flapper and is formed from one piece of springy sheet material therewith, said flapper having at its downstream end a pair of laterally spaced lobes between which the upstream end of said leaf spring is located.

References Cited

UNITED STATES PATENTS

| 530,442 | 12/1894 | Munger | 137—517 |
| 2,928,414 | 3/1960 | Streeter | 137—517 |
| 3,115,155 | 12/1963 | Clark | 137—525.3 X |

FOREIGN PATENTS

| 179,713 | 5/1922 | England. |
| 990,176 | 4/1965 | England. |
| 987,301 | 5/1949 | France. |
| 1,000,199 | 1/1957 | Germany. |

WILLIAM F. O'DEA, *Primary Examiner.*

W. WRIGHT, *Assistant Examiner.*